Dec. 1, 1942.  F. M. REID  2,303,580
SEMI-TRAILER
Filed Jan. 18, 1939  2 Sheets-Sheet 1

INVENTOR
Frederick M. Reid.
BY
Harness, Dickey & Pierce.
ATTORNEYS.

Dec. 1, 1942.  F. M. REID  2,303,580
SEMI-TRAILER
Filed Jan. 18, 1939  2 Sheets-Sheet 2
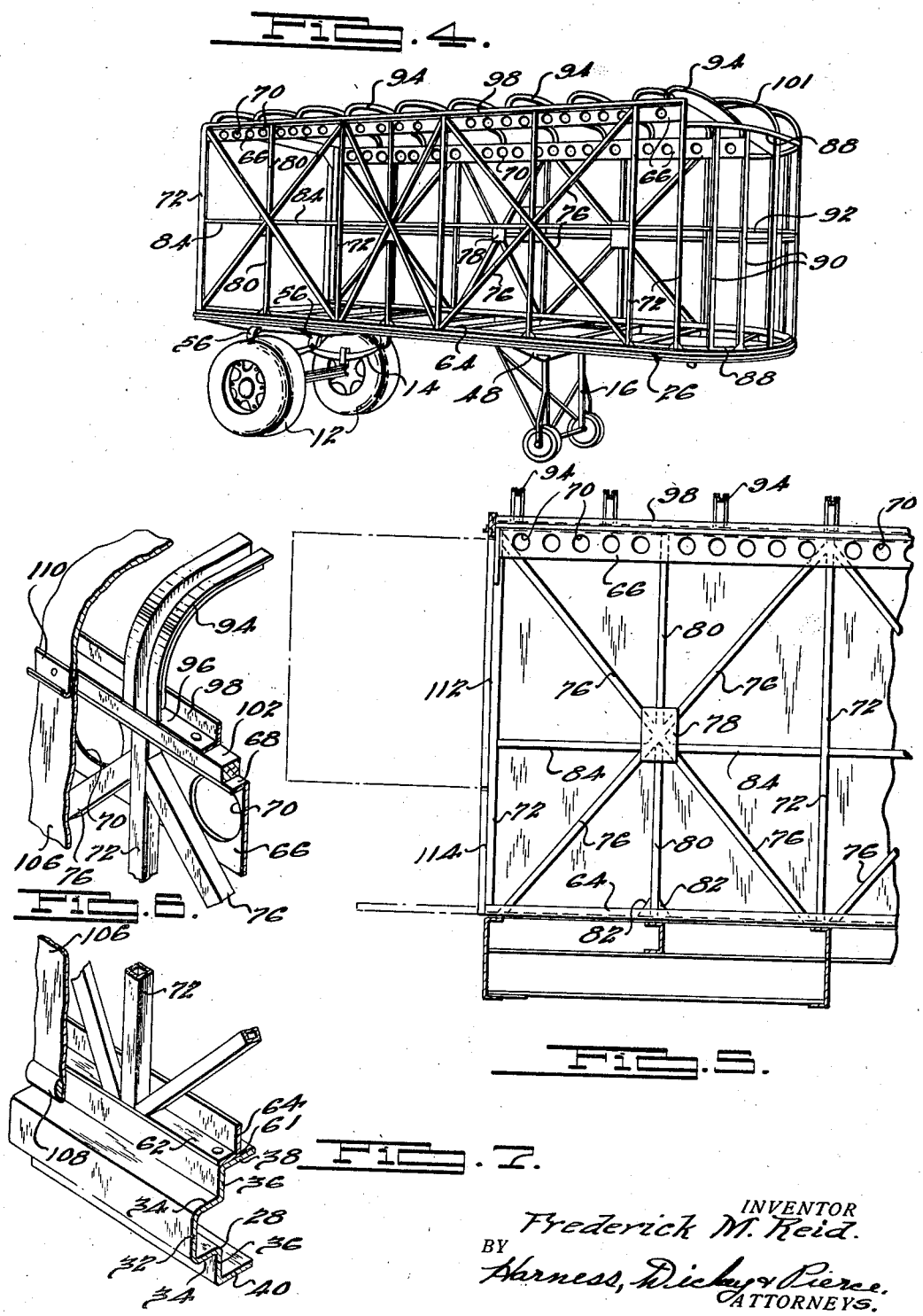

Patented Dec. 1, 1942

2,303,580

UNITED STATES PATENT OFFICE 2,303,580

SEMITRAILER

Frederick M. Reid, Detroit, Mich., assignor to Fruehauf Trailer Company, Detroit, Mich., a corporation of Michigan Application January 18, 1939, Serial No. 251,612

2 Claims. (Cl. 296—30)

The present invention relates to vehicle bodies and particularly relates to vehicle bodies of the semi-trailer type.

One of the primary objects of the present invention is to provide a semi-trailer vehicle body in which the unproductive weight is substantially reduced so that the maximum pay loads may be hauled.

Another object of the invention is to provide a unitary base frame and unitary side frames of such simple construction that the units may be readily manufactured and assembled and are so constructed that the load is properly distributed through the members forming the frame so that the side panels do not carry any of the load.

Another object of the invention is to provide an improved semi-trailer frame construction in which the forward end of the frame is supported through a fifth wheel structure and the rear end supported on a wheel axle in which the load stresses between the supports are primarily taken by the frame construction through diagonal trusses.

Another object of the invention is to provide a construction in which the side panels are not stressed so that aluminum panels may be used, thus providing a further saving in unproductive weight.

Other objects of the invention will become apparent from the following specification, the drawings relating thereto, and from the claims hereinafter set forth.

In the drawings, in which like numerals are used to designate like parts in the several views throughout:

Fig. 4 is a view similar to Fig. 1, showing the semi-trailer with the panels removed so that the skeleton constructions of the upper frame members are illustrated in their association with the bottom frame;

Fig. 5 is a fragmentary, interior side elevational view of the frame construction illustrated in Fig. 4;

Fig. 6 is an enlarged, fragmentary, perspective view illustrating certain details of the frame construction according to the present invention; and Fig. 7 is a view similar to Fig. 6, illustrating other details of the present invention.

Figure 1:
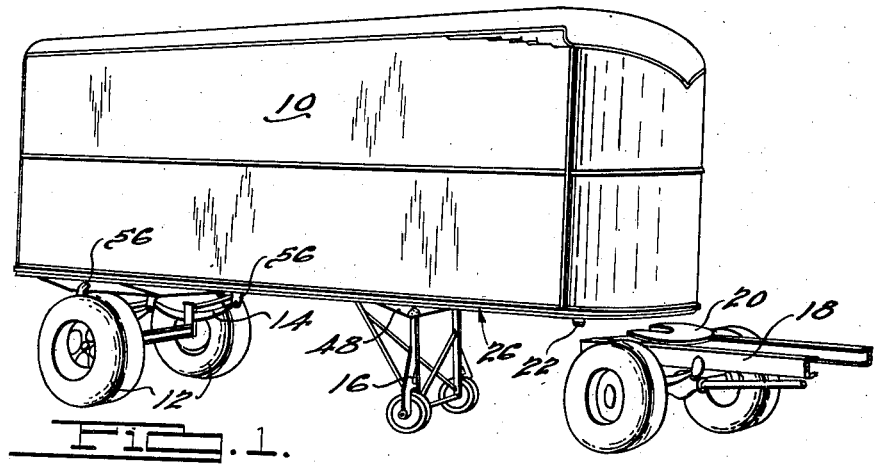
Figure 1 is a perspective view of a semi-trailer constructed according to the present invention; associated with the rear end of a tractor.
Figure 2:
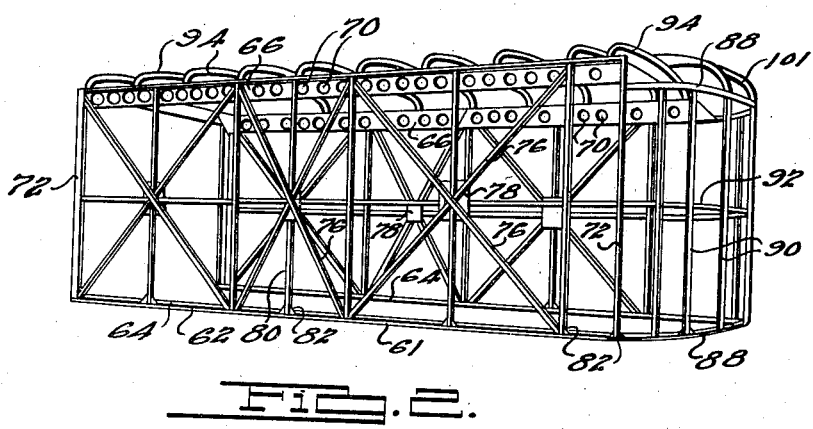
Fig. 2 is a perspective view of side, top and front frame construction of the semi-trailer according to the present invention.
Figure 3:
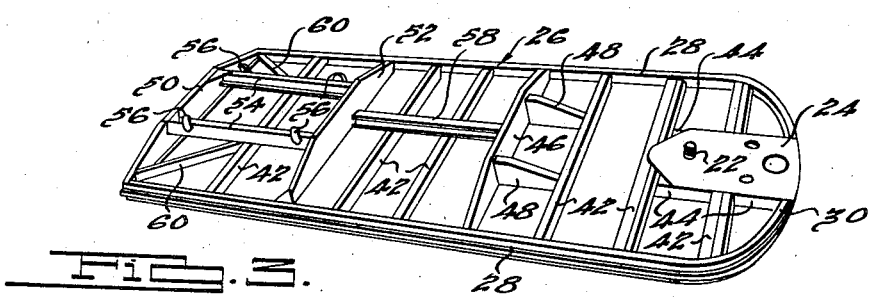
Fig. 3 is a bottom perspective view of the base frame construction according to the present invention.

Referring to the drawings, a semi-trailer is illustrated at 10 having the usual ground wheels 12 associated therewith and connected to the semi-trailer 10 adjacent the rear end thereof through suitable spring suspension means indicated at 14. The usual retractable ground engaging means 16 are illustrated which are disposed adjacent the forward end of the semi-trailer and are so constructed that they may be lowered to support the forward end of the trailer when it is disconnected from a tractor. The rear end of the tractor is partially illustrated at 18 and is adapted to be connected to the forward end of the semi-trailer 10 through the usual fifth wheel mechanism, which includes a plate member 20 so constructed as to engage a kingpin 22 which is mounted on a supporting plate 24. The supporting plate 24 is connected to the base frame of a semi-trailer in a manner to be described hereinafter.

The base frame is generally indicated at 26 and is preferably made of light gauge, high tensile pressed steel elements in which all connections are preferably nested and welded. The frame 26 includes a rub-rail 28 which extends along the sides and is curved around the front 30 of the frame. The rub-rail 28 is of channel section having a central web 32 and sides 34 which are turned outwardly therefrom at 36. The portions 36 are flanged inwardly at 38 and 40.

Transverse members 42, which are longitudinally spaced from each other, are provided, having their ends nested within the inner face of the rub-rail sides and preferably are welded thereto. The members 42 serve to support the vehicle floor members.

Longitudinally extending frame members 44 are fixed to the forward members 42 and to the curved front 30 of the rub-rail and serve as mounting means for the fifth wheel plate 24. A transversely extending plate member 46 having longitudinally extending members 48 fixed thereto and to an adjacent member 42 serve as the mounting means for the retractable ground engaging means 16.

A transversely extending plate member 50 is fixed to and connects the rear ends of the rub-rail 28, thus forming a closed frame. A similar transverse plate member 52 is spaced inwardly from the member 50; and longitudinally disposed members 54 extend between the members 50 and 52 and are connected thereto. The members 54 serve as mounting means for spring hangers 56 to which the leaf springs of the spring suspension means 14 are mounted.

A longitudinally extending bracing member 48 is disposed between the plate members 56 and 52 and has its ends fixed thereto, so as to strengthen the frame construction and particularly to strengthen the mounting means for the retractable support and the spring suspension. Bracing members 60 are also preferably provided adjacent the rear of the base frame and extend from the corners of the base frame at an angle to the rear transverse frame member 42 and have the ends thereof fixed to the plate member 50 and to the rear member 42.

The above described construction provides a unitary base frame, together with a sub-frame, which serves to support the main body construction which includes sides, top, and front frame constructions.

The body skeleton includes sides, front and top frames, each of which may be formed into units for ready assembly. The side frames each include a longitudinally extending, outwardly disposed angle member 61, having a bottom flange 62 and an upstanding flange 64. A longitudinally extending top frame member 66 having its upper edge outwardly flanged at 68 is provided for each side. Such member is preferably of high tensile steel and the upstanding portion thereof is perforated therealong at 70 to effect an additional saving in weight.

Vertical posts 72 interconnect the angle members with the top frame member and are longitudinally spaced along the sides of the frame. The lower ends of such members 72 rest upon the flange 62 of the angle member and bear against the outer face of the flange 64 thereof. Such elements are preferably welded together. The upper ends of the members 72 bear against the under face of the flange 68 and against the outer face of the upstanding portion of the member 66 and are preferably welded thereto.

Diagonal trusses 76 extend across the rectangles formed by the upstanding posts 72 with the member 66 and angle member 61 and have their lower ends welded to the flange 62 and their upper ends welded to the vertical posts 72 adjacent the corner. The members 76 cross each other and preferably lie in the same plane so that one of the members may be of a single length, while the other may be in two sections, having the ends thereof abutting against and welded to the single length diagonal cross at the crossing position. A plate member 78 may be welded to the members 76 at the point of intersection on the inner faces thereof.

Vertical frame members 80, similar in construction to the members 72, extend between the plate member 80 and the angle member 62 and the top frame member 66, respectively, and are welded to these elements to further brace the frame construction. The frame elements 80 may be fixed to the flange 62 through gussets 82, and the elements are preferably welded together.

Horizontal frame elements 84 are preferably welded to the outer face of the plate member 78 slightly under the point of intersection of the diagonal trusses and are also welded to the upstanding posts 72 to also further brace the frame construction.

The vertical posts 72, the diagonal trusses 76 and the frame elements 80 and 84 are preferably formed from extended, light-gauge, square seamless tubing; and such elements are preferably of such dimension relative to the depth of the flanges 62 and 68 that the outer surfaces thereof lie in substantially the same plane.

The front frame is preferably formed of upper and lower curved angle members 88 which are similar to the angle members 61 and which are curved on substantially the same curvature as the curved front 30 of the base frame. Vertical posts 90 which are similar to the vertical posts 72 have their ends fixed to the angle members 88 in the same manner that the vertical posts 72 are connected to the angle members 62 and 64. Horizontal bracing members 92 of similar construction may be disposed between the adjacent posts 90 and between the end post and the adjacent end post 72 to further brace the frame construction. The ends of the angle members 88 may then be welded to the angle members 61 and to the forward upstanding posts 72 so that the sides and front form a unitary construction.

Roof bows 94 are disposed transversely of the body at longitudinally spaced intervals therealong and have their ends welded to a flange 96 of an angle member 98. The bows 94 are preferably channel shape with the edges thereof flanged outwardly and are so arranged that the channels are disposed upwardly. Similar bow members 101 may be disposed at the front of the body connecting the front bow 94 with the angle member 98 so as to complete the top construction.

From the above it will be seen that there are three general skeleton frame units which may be readily assembled together. One of such units is the base frame 26, another of such units is the unit formed by the side frames and front frame, and the other of said units is the roof unit formed by the bows 94 and the angle members 98.

The main body unit may be assembled to the base unit by setting the flanges 62 of the longitudinally disposed angle members 61 and also a similar flange on the lower angle member 88, on the top surface of the flange 38 of the rub-rail 28. The flange 62 may then be bolted or otherwise suitably secured to the flange 38.

In order to fix the roof unit to the main body unit, tacking strips 102, preferably of wood, are disposed on the top surface of the flanges 68. The flange 96 of the angle member 98 may then be set upon the top surface of the strips 102 and the members may be fixed together by bolts which extend through the flanges 96 and 68 and also through the wood strip 102.

The body construction is completed by the application of the side, front and top panels to the skeleton frame; and, since these panels are not stressed panels, it is practical to use aluminum, in which case, a further saving in unproductive weight is attained. Such panels are indicated at 106 and the side panels may be disposed over the outer surface of the side skeleton frame. The side panels extend down over the portion 36 of the rub-rail so that they overlap the joint between the angle member 61 and flange 38. A molding 108 preferably extends along the bottom edges of the panels and the bottom edge may be suitably secured to the portion 36 of the rub-rail. The top and front panels may be similarly applied over their skeleton frames and the adjacent edges of the top and side panels preferably overlap, as best shown in Fig. 6. A drip-rail 110 extends along the panels over this position of overlapping; and the rail 110 and the panels may be fixed to the skeleton frame by tacking to the wooden tacking strips 102. The side panels can thus be removed and replaced without disturbing the skeleton structure, which is a decided service advantage.

As mentioned above, the side panels are not stressed panels, so that all of the load is taken by the skeleton construction. The diagonal trusses 76 take up considerable of the stresses and it will be noted that the forwardmost diagonal strut is positioned above the base frame, when the units are assembled, so that the lower end thereof lies in a position closely adjacent the kingpin 22, or the position at which considerable of the load is applied. The trusses are then so arranged between the forward end and the supports for the ground wheels that the principal load stresses are carried by the diagonal trusses.

The rear end of the vehicle may be closed by the usual doors, which may be either half-doors and light-weight tail gate, or full double doors with no tail gate. In the embodiment illustrated, half-doors are shown at 112 with a light-weight tail gate 114. These doors may be mounted to the frame construction in the usual way.

Formal changes may be made in the specific embodiment of the invention described without departing from the spirit and substance of the invention, the scope of which is commensurate with the appended claims.

What is claimed is:

1. A vehicle body comprising a frame unit having a longitudinally extending, channel-shaped rub-rail extending completely along the sides and around the front thereof, said rub-rail having an upstanding portion which terminates in an inwardly disposed, substantially horizontal top flange, a body frame unit having a longitudinally extending angle member along the lower edge thereof, the horizontal flange of said angle member mating with said first-named flange with the outer edge thereof substantially flush with said upstanding portion of said rub-rail, said body frame unit having rigid vertical members provided with substantially flat outer surfaces disposed on the horizontal flange of said angle member, the outer surfaces of said vertical members being substantially flush with said upstanding portion of said rub-rail, and an outer body panel disposed over said body frame against the outer surfaces of said vertical members, said body panel overlapping the joint of said first two named flanges and overlying said upstanding portion of said rub-rail.

2. A vehicle body comprising a frame unit having a longitudinally extending, channel-shaped rub rail extending completely along the sides and around the front thereof, said rub-rail having an upstanding portion which terminates in an inwardly disposed, substantially horizontal top flange, a body frame unit having a longitudinally extending angle member along the lower edge thereof, the horizontal flange of said angle member mating with said first named flange and being disposed with the free edge thereof outwardly, and said body frame unit having rigid vertical members which are substantially rectangular in cross-section disposed on the horizontal flange of said angle member with the outer faces thereof substantially flush with the outer edge of said single member.

FREDERICK M. REID.